United States Patent
Jones

(10) Patent No.: US 11,848,964 B2
(45) Date of Patent: Dec. 19, 2023

(54) ZERO TRUST END POINT NETWORK SECURITY DEVICE

(71) Applicant: Raytheon Company, Tewksbury, MA (US)

(72) Inventor: Frederick K. Jones, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 143 days.

(21) Appl. No.: 17/158,345

(22) Filed: Jan. 26, 2021

(65) Prior Publication Data

US 2022/0239697 A1    Jul. 28, 2022

(51) Int. Cl.
| | |
|---|---|
| H04L 29/06 | (2006.01) |
| H04L 29/08 | (2006.01) |
| H04L 29/12 | (2006.01) |
| H04L 9/40 | (2022.01) |
| H04L 61/5007 | (2022.01) |
| H04L 61/4511 | (2022.01) |

(Continued)

(52) U.S. Cl.
CPC .......... *H04L 63/20* (2013.01); *H04L 61/4511* (2022.05); *H04L 61/5007* (2022.05); *H04L 63/083* (2013.01); *H04L 63/0861* (2013.01); *H04L 63/0884* (2013.01); *H04L 63/1425* (2013.01); *H04L 63/18* (2013.01); *H04L 67/02* (2013.01); *H04L 9/3263* (2013.01); *H04L 2463/082* (2013.01)

(58) Field of Classification Search
CPC . H04L 63/20; H04L 61/4511; H04L 61/5007; H04L 63/083; H04L 63/0861; H04L 63/0884; H04L 63/1425; H04L 63/18; H04L 67/02; H04L 2463/082; H04L 63/0853; H04L 63/0281; H04L 63/1408

USPC ........................................................... 726/7
See application file for complete search history.

(56) References Cited

U.S. PATENT DOCUMENTS 10,009,773 B2 * 6/2018 Smith ................. H04W 12/068
10,299,132 B2 * 5/2019 Tas ......................... H04W 24/02
(Continued)

FOREIGN PATENT DOCUMENTS

WO    WO-2022164751 A1    8/2022

OTHER PUBLICATIONS

Social login with OAuth for mobile applications: User's view, Ho et al., May 2016 (Year: 2016).*
(Continued)

*Primary Examiner* — Jahangir Kabir
(74) *Attorney, Agent, or Firm* — Schwegman Lundberg & Woessner, P.A.

(57) ABSTRACT

Discussed herein are devices, systems, and methods for zero trust endpoint network security. A method can include providing, by a ZTENS device, first data indicating the ZTENS device is communicatively coupled to a compute device, providing, by the ZTENS device and over a first communication channel through a web application of the compute device, one or more URLs, receiving, by the ZTENS device and over the first communication channel, data indicating a URL of the one or more URLs selected by a user of the compute device through the web application, communicating, by the ZTENS device a request for website data of a website associated with the selected URL, and receiving, by the ZTENS device, the website data and providing the website data to the compute device.

20 Claims, 3 Drawing Sheets

(51) Int. Cl.
*H04L 67/02* (2022.01)
*H04L 9/32* (2006.01)

(56) References Cited

U.S. PATENT DOCUMENTS

| | | | |
|---|---|---|---|
| 10,911,428 B1* | 2/2021 | Roth | H04L 9/3213 |
| 2003/0035409 A1* | 2/2003 | Wang | H04L 61/00 |
| | | | 370/349 |
| 2007/0294457 A1 | 12/2007 | Gantman et al. | |
| 2008/0052245 A1* | 2/2008 | Love | H04L 9/3228 |
| | | | 705/76 |
| 2010/0250761 A1 | 9/2010 | Hird et al. | |
| 2014/0189799 A1* | 7/2014 | Lu | H04L 63/102 |
| | | | 726/4 |
| 2016/0142375 A1* | 5/2016 | Tubi | H04L 63/0884 |
| | | | 726/4 |
| 2017/0324729 A1* | 11/2017 | Hon | H04L 63/083 |
| 2020/0236112 A1 | 7/2020 | Pularikkal et al. | |
| 2022/0215453 A1* | 7/2022 | Achan | G06F 21/6218 |

OTHER PUBLICATIONS

"International Application Serial No. PCT/US2022/013519, International Search Report dated May 4, 2022", 4 pgs.
"International Application Serial No. PCT/US2022/013519, Written Opinion dated May 4, 2022", 7 pgs.

* cited by examiner

US 11,848,964 B2

ZERO TRUST END POINT NETWORK SECURITY DEVICE

TECHNICAL FIELD

Embodiments discussed herein regard devices, systems, and methods for network security. The network security can be single or multiple, but limited, use.

BACKGROUND

A majority of data on an external network is accessed through a web application, such as a web browser a web app. Security for a compute device that requests the data is provided by software on the compute device. Typically, the software is part of the web application, operating system (OS), or firewall of the compute device. This security is limited in its flexibility and the user of the compute device is in charge of the security provided. The owner of the data being accessed has no control over the security after the data has left their database.

DETAILED DESCRIPTION

Figure 1:
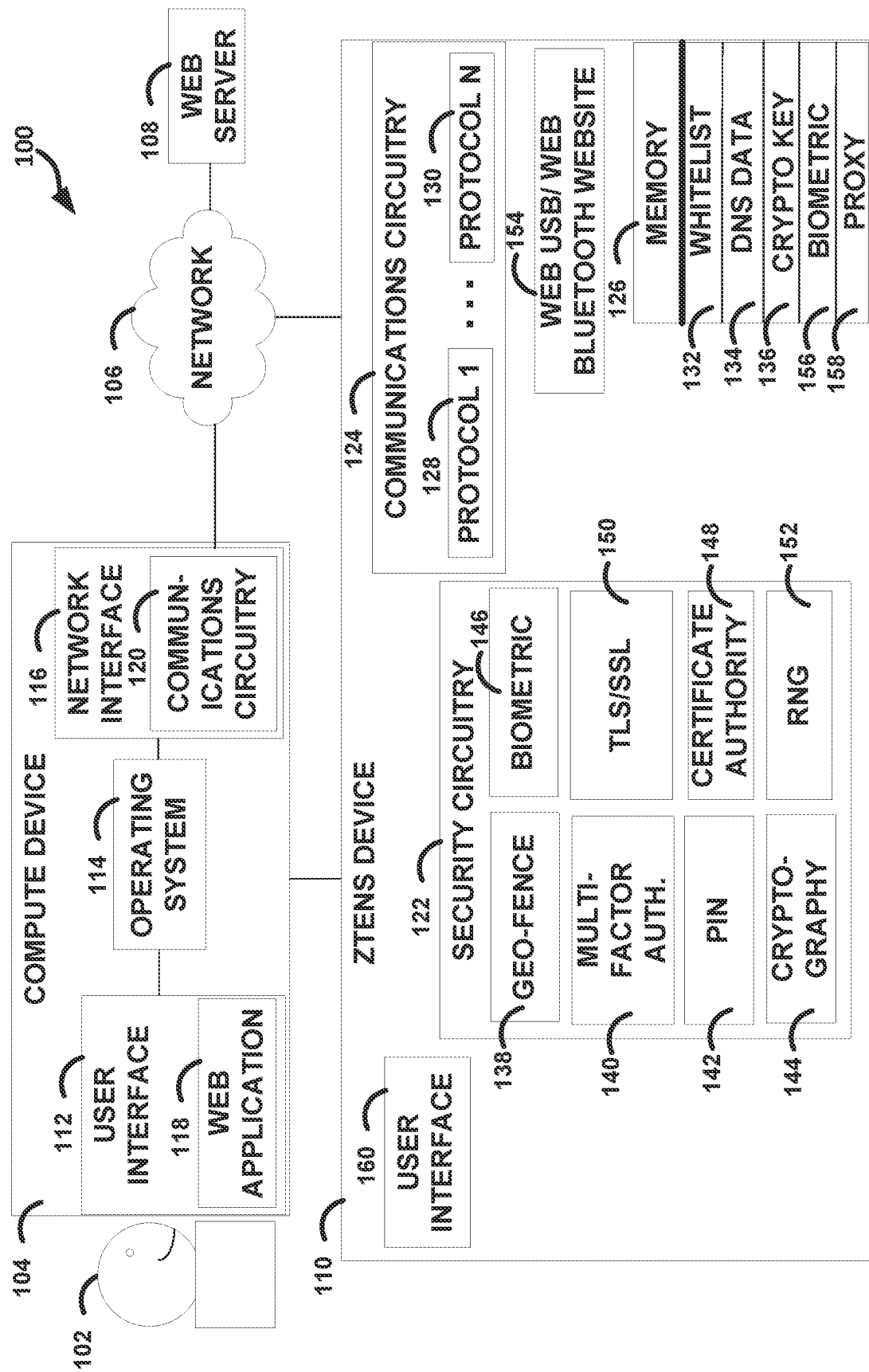
FIG. 1 illustrates, by way of example, a diagram of an embodiment of a system that includes a zero trust endpoint network security (ZTENS) device.

FIG. 1 illustrates, by way of example, a diagram of an embodiment of a system 100 including a zero trust endpoint network security (ZTENS) device 110. The system 100 as illustrated includes a compute device 104 operable by a user 102. The compute device 104 can be communicatively coupled to an external network 106. The compute device 104 can be communicatively coupled to the ZTENS device 110. The ZTENS device 110 can be communicatively coupled to the network 106. The network 106 is communicatively coupled to a web server 108.

The user 102 can access functionality of applications or hardware of the compute device 104 through a user interface 112. The user interface 112 can, for example, provide the user 102 with access to functionality or data through a web application 118. The web application 118 can include a web browser, a web app (e.g., a mobile app or other application that accesses data or services on another network). The web application 118 is accesses functionality of hardware or software that runs on the web server 108, unlike computer-based software programs that are run locally on the operating system (OS) 114 of the device 100. Web functionality or hardware is accessed by the user 102 through the web application 118 using an active internet connection (provided by the ZTENS device 110). Web functionality is programmed using a client-server modeled structure—the user 102 ("client") is provided services through an off-site server (web server 108) that is hosted by a third-party. Examples of commonly-used web applications include: web-mail, online retail sales, online banking, data storage, and online auctions.

Typically, when the user 102 wants to access web functionality, the user 102 will enter a uniform resource locator (URL) into a web browser or launch the web application 118. The web application 118 can then access functionality of a network interface 116 through an operating system (OS) 114. The OS 114 provides applications, like the web application 118, with access to functionality of hardware of the compute device 104. Communications circuitry 120 of the network interface 116 is an example of such hardware.

The communications circuitry 120 can implement a wired, data port protocol, such as Ethernet (e.g., Ethernet RJ45 or the like), universal serial bus (USB), controller area network (CAN), serial peripheral interface (SPI), inter-integrated circuit (I²C), universal asynchronous transmit/receive (UART), firewire, or the like over a physical port or bus. The communications circuitry 120 can, additionally or alternatively, implement a wireless communication protocol, such as Bluetooth®, WiFi, or a cellular data communication channel, such as long term evolution (LTE), fifth generation (5G), institute of electric or electronic engineers (IEEE) 802.11), or the like, using a transmitter, receiver, or transceiver.

The OS 114 can issue a command to the network interface 116 that causes communication of a request for data corresponding to the URL. The network 106 can communicate with the web server 108 to retrieve the data of the URL. The web server 108 can return the data corresponding to the URL to the compute device 104 through the network 106. The user 102 can then view the data corresponding to the URL through the web application 118.

This process of accessing the data corresponding to the URL includes security risks. An adversary can intercept a communication between the compute device 104 to the network 106. An adversary can intercept the communication between the network 106 and the web server 108. The adversary can alter the data in the intercepted communication. The altered data can harm one or more of the compute device 104, the network 106, or the web server 108. The altered data can spoof a domain name service (DNS) conversion of a URL to an internet protocol (IP) address, be a part of a distributed denial of service (DDOS) attack, include credential stuffing, or the like. The OS 114 and the web application 118 can include software or hardware configured to help mitigate these vulnerabilities, but no true solution for mitigation of these vulnerabilities is currently known. These vulnerabilities of the typical URL data access can be mitigated using the ZTENS device 110.

The ZTENS device 110 as illustrated includes a web USB/web Bluetooth® application 154. WebUSB and Web-Bluetooth are application programming interface (API) standards for securely providing access to USB or Bluetooth® devices from a web browser (through web pages). The WebUSB standard, for example, was published by the Web Platform Incubator Community Group.

The application 154 can launch when the user 102 communicatively connects to the ZTENS device 110 through the compute device 104. The application 154 can cause the web browser 118 to show a home page of the ZTENS device 110. The home page of the ZTENS device 110 can present services available from the ZTENS device. The user 102 can interact with the ZTENS device 110 through the web application 118, such as by selecting an available service. The service can include a URL to a website accessible through (e.g., only through) the ZTENS device 110.

The ZTENS device 110 further includes security circuitry 122, communications circuitry 124 (similar to communications circuitry 120), and a memory 126. The security circuitry 122 provides intrusion detection and/or prevention, such as to help reduce a likelihood of communications intercept, spoofing, or other attack. The communications circuitry 124 provides wired and/or wireless communications capability to the ZTENS device 110. The communications circuitry 124 can communicate with the compute device 104 or the network 106. The compute device 104 can communicate with the network 106, through the ZTENS device 110.

Instead of relying on the security provided by the OS 114, web application 118, or other component of the compute device 104, the user 102 can improve web security by using the ZTENS device 110.

The application 154 can cause (through the communications circuitry 124) the web application 118 to present a list of one or more acceptable URLs 132 (or links to acceptable URLs 132) that when selected navigates, through the ZTENS device 110, to the website corresponding to the selected URL. Communications to the ZTENS device 110 can be secured by security circuitry 122.

The security circuitry 122 as illustrated includes a geo-fence application 138, multi-factor authentication application 140, personal identification number (PIN) 142, cryptography 144 hardware and/or software, biometric 146 hardware and/or software, transport layer security (TLS) 150, certificate authority 148, and a random number generator (RNG) 152. The security circuitry 122, in general, provides intrusion detection and/or prevention for communications to or from the ZTENS device 110.

The geo-fence 138 can include a global positioning system (GPS), Galileo, or other geo location circuitry configured to determine a location of the ZTENS device 110. The geo-fence 138 can include rules defining locations at which functionality of the ZTENS device 110 is accessible and/or inaccessible. The geo-fence 138 can force the user 102 to only use the ZTENS device 110 in a specified geographic location.

The multi-factor authentication 140 can prohibit access to the functionality of the ZTENS device 110, unless the user 102 can provide multiple forms of authentication. Examples of authentication include a password, PIN (e.g., the PIN 142), biometric (e.g., fingerprint, iris or face scan, or the like, through the biometric 146), a verification code sent to a personal electronic mail (email), phone, or the like, among others.

The PIN 142 can include a hardware interface, such as a keypad (e.g., on a touch screen) through which a PIN of the user 102 can be entered. The PIN 142 entry can help ensure that the user 102 is authorized to access functionality of the ZTENS device 110.

The cryptography 144 can implement symmetric, asymmetric, or other cryptographic techniques. The cryptography 144 can include hardware or software cryptographic techniques. Symmetric cryptography is generally more secure than asymmetric cryptography and can be preferred. In symmetric cryptography, a single key is used to encrypt and decrypt data. In asymmetric cryptography a private key is used for encryption and a public key is used for decryption. It is possible to determine a private key based on the public key, thus making asymmetric cryptography less secure. The symmetric cryptography can be implemented using a secure RNG 152, a password, or code. Examples of symmetric encryption include advanced encryption standard (AES), data encryption standard (DES), international data encryption algorithm (IDEA), or Rivest cipher (RC) (e.g., RC4, RC5, or RC6). Secure socket layer (SSL) and transport layer security (TLS) 150 are example protocols (used by hypertext transport protocol secure (HTTPS)) that implement asymmetric cryptography protocols. Rivest-Shamir-Adleman (RSA), Diffie-Helman, Elliptic-curve cryptography (ECC), El Gamal, and digital signature algorithm (DSA) are examples of asymmetric cryptography protocols.

The biometric 146 hardware and/or software can be accessed through a user interface 160 through which the user 102 provides biometric data. The biometric 146 hardware and/or software can perform an iris scan, a face scan, a fingerprint scan, or the like of the user 102. The memory 126 can include expected biometric 156 data of the user 102 from a previous biometric scan. The biometric 146 hardware and/or software can be used to help guarantee that only an authorized user accesses functionality of the ZTENS device 110.

A certificate authority 148 issues digital certificates certifying the ownership of the cryptography key 136. The certificate authority 148 allows the manage of the web server 108 that hosts the website on the acceptable URLs 132 to certify ownership of the cryptography key 136. The certificate authority 148, along with TLS/SSL 150, can enable HTTPS communication between the compute device 104 and the ZTENS device 110.

The memory 126 can include a acceptable URLs 132 of one or more websites (in the form of URLs) that can be accessed through the ZTENS device 110. The acceptable URLs 132 can include websites that include information that is more sensitive than usual. Examples of such websites include personal or business banking websites, medical record websites, utility service websites, insurance websites, government websites, internal revenue service (IRS) tax filing, covert communications, or the like. The ZTENS device 110 can include a replacement for a virtual private network (VPN). The memory 126 can include proxy data 158 that can be used to hide an actual IP address of the compute device 104 or the ZTENS device 110.

The DNS data 134 can associate, for each website of the acceptable URLs 132, a URL with an IP address. The DNS data 134 can take the place of the normal DNS server access, and thus eliminates any vulnerabilities associated with such normal DNS server access.

The crypto key 136 includes one or more symmetric or asymmetric cryptography keys. The crypto key 136 can be used by the cryptography 144 hardware and/or software to encrypt or decrypt data of a communication.

The communications circuitry 124 implements one or more different communications protocols 128, 130. The communications protocol can include a protocol discussed regarding the communications circuitry 120. The communications circuitry 124 can be configured to communicate with the compute device 104 using the first communications protocol 128 and the network 106 using the second communications protocol 130. The application 154 can allow the user 102 to interact with the ZTENS device 110 over Bluetooth®, USB, or other communication protocol, through the web application 118.

The communications circuitry 124, in some embodiments, can parse a communication to a single endpoint (e.g., the web server 108) into two or more disjoint packets. The communications circuitry 124 can then transmit the disjoint packets of the multiple packets using two or more respective communications protocols. The communications circuitry 124 thus transmit a first portion of a communication using a wireless fidelity (WiFi), Ethernet, or cellular data communication channel (e.g., LTE, 5G, or the like) and a second, different portion of the communication using a different one of the wireless fidelity, Ethernet, or cellular data communication channel, for example. More portions and more communication protocols can be used.

The ZTENS device 110 can be issued by a host of a website accessible through the web server 108. The host can restrict access to the website to only those users that can pass the security measures of the ZTENS device 110. This allows the host of the website to manage the security required to access the website. Normally, the user 102 accesses the website with just the security of the web application 118 or the OS 114. Requiring the protocols of the ZTENS device 110 for accessing the website puts the security of the website into the hands of the website host.

Further security can be provided by the ZTENS device 110 by implementing one or more of ephemeral IPv6 (or the like), net maneuver, port knocking, channel hopping, or the like. The ZTENS device 110 can include further enhancement using physical security measures (e.g., tamper evidence, tamper resistance, or the like). The ZTENS device 110 can provide a replacement for a common access card (CAC), such as a public key infrastructure (PKI) card, Yubikey card, or the like.

In use, the user 102 can connect the ZTENS device 110 to the compute device 110. The user can input a PIN using the PIN 142, biometric data through the biometric 146 hardware and/or software, a username, password, a certification code using the multi-factor authentication 140, or a combination thereof to authenticate themselves and gain access to the ZTENS device 110. Authentication is a process of verifying an identity of the user 102. Passing authentication can allow the user 102 to access further functionality of the ZTENS device 110 through the web application 118. The user 102 can issue a communication to the ZTENS device 110 through the web application 118. The communication can initiate ZTENS device 110 capabilities (e.g., hardware, software, or a combination thereof). The ZTENS device 110 can inspect content from the compute device 104, such as to detect malicious behavior or exfiltration of data. The ZTENS device 110 can transact with the network 106 using the communications circuitry 124, such as after performing URL translation to IP address (using the DNS data 134). The communication with the network 106 or the compute device 104 can be secured using TSL/SSL protocol 150, certificate authority 148, or the like. The ZTENS device 110 can receive content from the network 106 and detect malicious behavior or exfiltration of data (e.g., using a recurrent neural network (RNN) or the like). The ZTENS device 110 can provide content that passes inspection (e.g., by the RNN) to the web application 118 through the communications circuitry 124. The user 102 has then accessed the content of the website through the ZTENS device 110.

Figure 2:
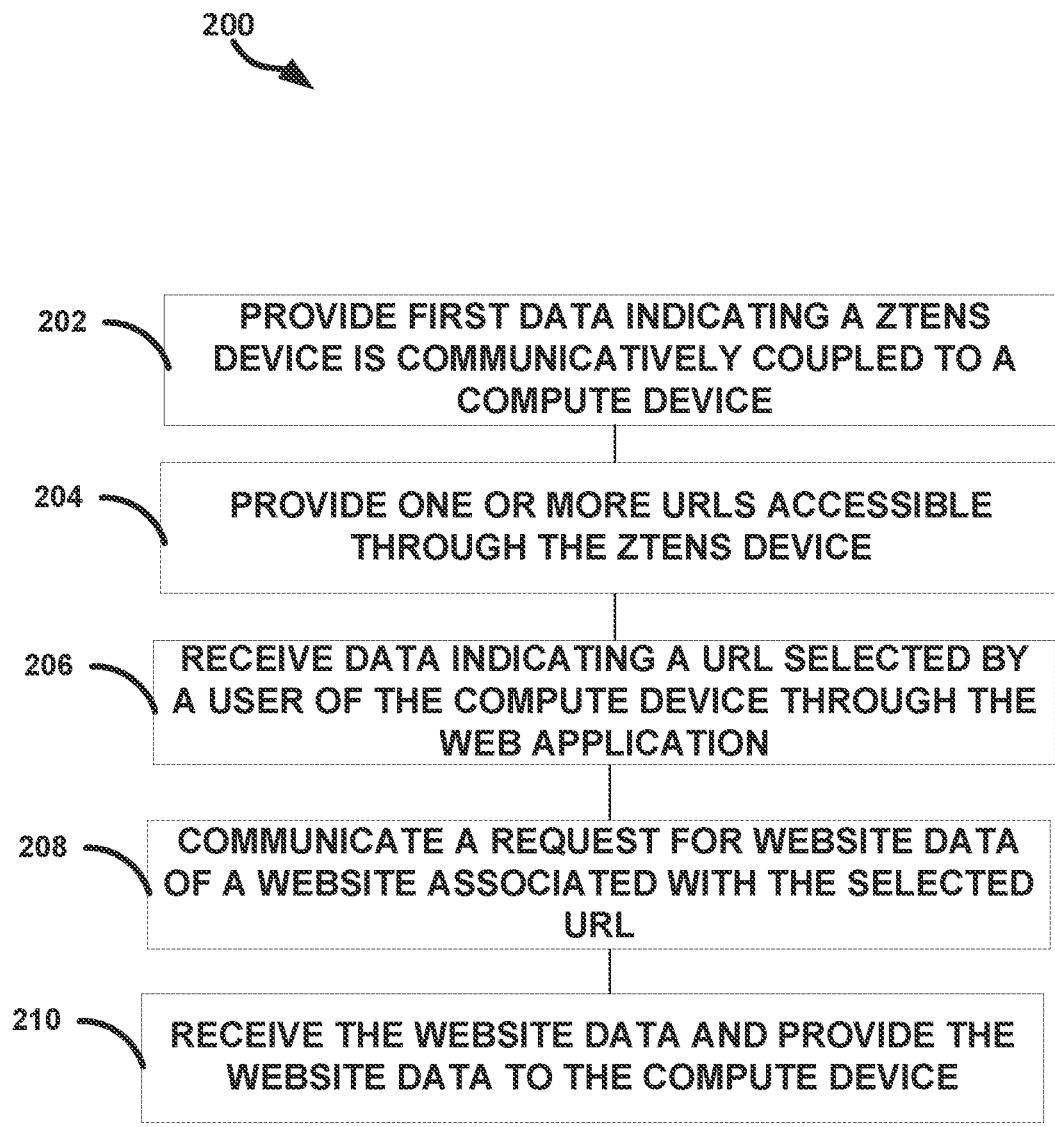
FIG. 2 illustrates, by way of example, a diagram of an embodiment of a method for ZTENS.

FIG. 2 illustrates, by way of example, a diagram of an embodiment of a method 200 for ZTENS. The method 200 as illustrated includes providing (by a ZTENS device communicatively coupled to a compute device, over a wired or wireless first communication channel, and through a web application of the compute device) first data indicating the ZTENS device is communicatively coupled to the compute device, at operation 202; providing (by the ZTENS device and over the first communication channel through a web application of the compute device) one or more uniform resource locators (URLs), at operation 204; receive (by the ZTENS device and over the first communication channel) data indicating a URL of the one or more URLs selected by a user of the compute device through the web application, at operation 206; communicating (by the ZTENS device and over a wired or wireless second communication channel, the second communication channel different from the first communication channel) a request for website data of a website associated with the selected URL, at operation 208; and receiving (by the ZTENS device and over the second communication channel), the website data and providing the website data to the compute device.

The method 200 can further include before communicating the request for website data, authenticating, by the ZTENS device, an identity of the user. The method 200 can further include, wherein authenticating the identity of the user includes receiving, by the ZTENS device, a personal identification number (PIN) or biometric scan data from the user through a user interface of the ZTENS device. The method 200 can further include, wherein authenticating the identity of the user includes using multi-factor authentication through the web application.

The method 200 can further include analyzing data from the compute device for malicious behavior or exfiltration of the data before communicating the request for website data. The method 200 can further include translating, by the ZTENS device, the URL to an internet protocol (IP) address using domain name service (DNS) data in a memory of the ZTENS device. The method 200 can further include parsing the request for website data into multiple packets, the multiple packets including different portions of the request for website data, and wherein communicating the request for website data includes communicating different packets of the multiple packets over different communication channels including the second communication channel and a third communication channel.

The method 200 can further include, wherein the second and third communication channels include different ones of a cellular data communication channel, a wireless fidelity communication channel, and an Ethernet communication channel. The method 200 can further include, wherein the first communication channel includes one of universal serial bus (USB) and Bluetooth operating using a webUSB or webBluetooth communication protocol. The method 200 can further include before providing the website data to the compute device, performing, by the ZTENS device, malicious behavior and exfiltration of data analysis on the website data.

Figure 3:
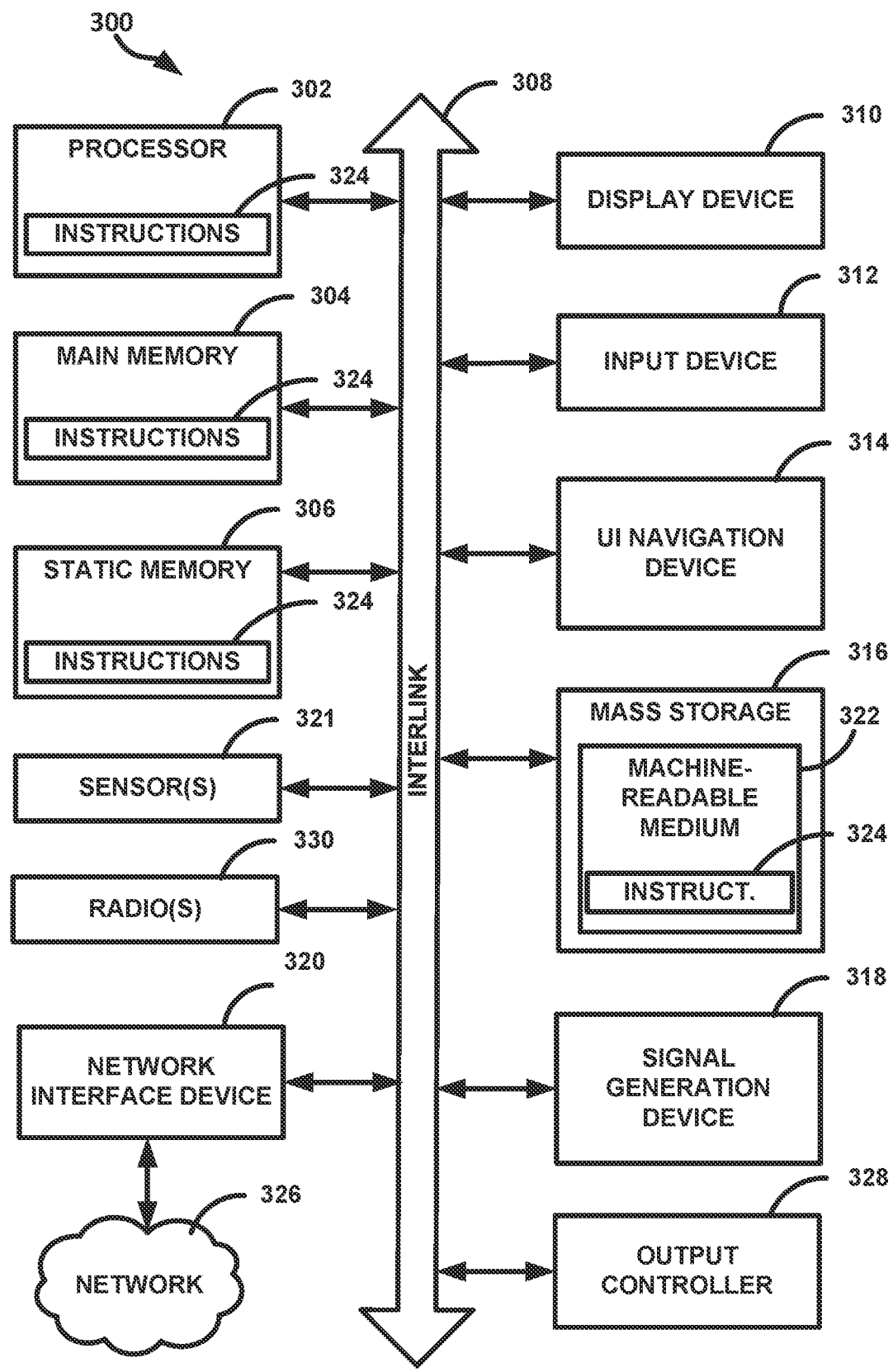
FIG. 3 illustrates, by way of example, a block diagram of an embodiment of a machine in the example form of a computer system within which instructions, for causing the machine to perform any one or more of the methodologies discussed herein, may be executed.

FIG. 3 illustrates, by way of example, a block diagram of an embodiment of a machine in the example form of a computer system 300 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a mass storage unit 316, a signal generation device 318 (e.g., a speaker), a network interface device 320, and a radio 330 such as Bluetooth, WWAN, WLAN, and NFC, permitting the application of security controls on such protocols.

The mass storage unit 316 includes a machine-readable medium 322 on which is stored one or more sets of instructions and data structures (e.g., software) 324 embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 324 may further be transmitted or received over a communications network 326 using a transmission medium. The instructions 324 may be transmitted using the network interface device 320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 can include a computer-implemented method for zero trust endpoint network security (ZTENS), the method comprising, providing, by a ZTENS device communicatively coupled to a compute device, over a wired or wireless first communication channel, and through a web application of the compute device, first data indicating the ZTENS device is communicatively coupled to the compute device, providing, by the ZTENS device and over the first communication channel through a web application of the compute device, one or more uniform resource locators (URLs), receiving, by the ZTENS device and over the first communication channel, data indicating a URL of the one or more URLs selected by a user of the compute device through the web application, communicating, by the ZTENS device and over a wired or wireless second communication channel, the second communication channel different from the first communication channel, a request for website data of a website associated with the selected URL, and receiving, by the ZTENS device and over the second communication channel, the website data and providing the website data to the compute device.

In Example 2, Example 1 can further include before communicating the request for website data, authenticating, by the ZTENS device, an identity of the user.

In Example 3, Example 2 can further include, wherein authenticating the identity of the user includes receiving, by the ZTENS device, a personal identification number (PIN) or biometric scan data from the user through a user interface of the ZTENS device.

In Example 4, at least one of Examples 2-3 can further include, wherein authenticating the identity of the user includes using multi-factor authentication through the web browser.

In Example 5, at least one of Examples 2-4 can further include analyzing data from the compute device for malicious behavior or exfiltration of the data before communicating the request for website data.

In Example 6, at least one of Examples 2-5 can further include translating, by the ZTENS device, the URL to an internet protocol (IP) address using domain name service (DNS) data in a memory of the ZTENS device.

In Example 7, at least one of Examples 2-6 can further include parsing the request for website data into multiple packets, the multiple packets including different portions of the request for website data, and wherein communicating the request for website data includes communicating different packets of the multiple packets over different communication channels including the second communication channel and a third communication channel.

In Example 8, Example 7 can further include, wherein the second and third communication channels include different ones of a cellular data communication channel, a wireless fidelity communication channel, and an Ethernet communication channel.

In Example 9, Example 8 can further include, wherein the first communication channel includes one of universal serial bus (USB) and Bluetooth operating using a webUSB or webBluetooth communication protocol.

In Example 10, at least one of Examples 2-9 can further include, before providing the website data to the compute device, performing, by the ZTENS device, malicious behavior and exfiltration of data analysis on the website data.

Example 11 includes a non-transitory machine-readable medium including instructions that, when executed by a machine cause the machine to perform operations for performing the method of at least one of claims 1-10.

Example 12 includes a system or apparatus configured to perform the method of at least one of claims 1-10.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for zero trust endpoint network security (ZTENS), the method comprising:
   providing, by a ZTENS device communicatively coupled to a compute device, over a wired or wireless first communication channel, and through a web application of the compute device, first data indicating the ZTENS device is communicatively coupled to the compute device;
   providing, by an application of the ZTENS device, over the first communication channel through the web application of the compute device, directly using the web application for presentation to the user, and without any web server intervention, a list of one or more uniform resource locators (URLs) that are accessible only through the ZTENS device;
   receiving, by the ZTENS device and over the first communication channel, data indicating a URL of the one or more URLs selected by a user of the compute device through the web application;
   communicating, by the ZTENS device and over a wired or wireless second communication channel, the second communication channel different from the first communication channel, a request for website data of a website associated with the selected URL for which the ZTENS device stores verification data for the selected URL; and
   receiving, by the ZTENS device and over the second communication channel, the website data and providing the website data to the compute device.

2. The method of claim 1, further comprising:
   before communicating the request for website data, authenticating, by the ZTENS device, an identity of the user.

3. The method of claim 2, wherein authenticating the identity of the user includes receiving, by the ZTENS device, a personal identification number (PIN) or biometric scan data from the user through a user interface of the ZTENS device.

4. The method of claim 2, wherein authenticating the identity of the user includes using multi-factor authentication through the web application.

5. The method of claim 2, further comprising analyzing data from the compute device for malicious behavior or exfiltration of the data before communicating the request for website data.

6. The method of claim 2, further comprising translating, by the ZTENS device, the URI: to an internet protocol (IP) address using domain name service (DNS) data in a memory of the ZTENS device.

7. The method of claim 2, further comprising parsing the request for website data into multiple packets, the multiple packets including different portions of the request for website data, and wherein communicating the request for website data includes communicating different packets of the multiple packets over different communication channels including the second communication channel and a third communication channel.

8. The method of claim 7, wherein the second and third communication channels include different ones of a cellular data communication channel, a wireless fidelity communication channel, and an Ethernet communication channel.

9. The method of claim 8, wherein the first communication channel includes one of universal serial bus (USB) and Bluetooth operating using a webUSB or webBluetooth communication protocol, respectively.

10. The method of claim 2, further comprising before providing the website data to the compute device, performing, by the ZTENS device, malicious behavior and exfiltration of data analysis on the website data.

11. A non-transitory machine-readable medium including instructions that, when executed by a zero trust endpoint network security (ZTENS) device, cause the ZTENS device to perform operations for ZTENS, the operations comprising:
    providing, by the ZTENS device communicatively coupled to a compute device, over a wired or wireless first communication channel, first data indicating the ZTENS device is communicatively coupled to the compute device;
    providing, by a first application of the ZTENS device, over the first communication channel, to the web application of the compute device, directly using the web application for presentation to the user, and without any web server intervention, a list of one or more uniform resource locators (URLs) of a limited number of URLs that are accessible only through the ZTENS device;
    receiving, over the first communication channel, data indicating a URL of the one or more URLs selected by a user of the compute device through the web application;
    communicating, over a wired or wireless second communication channel, the second communication channel different from the first communication channel, a request for website data of a website associated with the selected URL for which the ZTENS device stores verification data for the selected URL;
    and receiving, over the second communication channel, the website data and providing the website data to the compute device.

12. The non-transitory machine readable medium of claim 11, wherein the operations further comprise:
    before communicating the request for website data, authenticating an identity of the user.

13. The non-transitory machine readable medium of claim 12, wherein authenticating the identity of the user includes receiving, by the ZTENS device, a personal identification number (PIN) or biometric scan data from the user through a user interface of the ZTENS device.

14. The non-transitory machine readable medium of claim 12, wherein authenticating the identity of the user includes using multi-factor authentication through the web application.

15. The non-transitory machine readable medium of claim 12, wherein the operations further comprise analyzing data from the compute device for malicious behavior or exfiltration of the data before communicating the request for website data.

16. A system for zero trust endpoint network security (ZTENS), the system comprising:
    a compute device including a user interface, communications circuitry, and a web application; a ZTENS device communicatively coupled to the compute device through first and second wired or wireless communication channels of communications circuitry and through the web application, the ZTENS device including security circuitry and the communications circuitry, the ZTENS device configured to:

provide, by the communications circuitry, first data indicating the ZTENS device is communicatively coupled to the compute device;

provide, by an application of the ZTENS device, over the first communication channel, through the web application, directly using the web application for presentation to the user, and without any web server intervention, a list of one or more uniform resource locators (URLs) accessible only through the ZTENS device;

receive, over the first communication channel, data indicating a URL of the one or more URLs selected by a user of the compute device through the web application;

communicate, over the second communication channel and to a web server, a request for website data of a website associated with the selected URL for which the ZTENS device stores verification data for the selected URL;

and receive, over the second communication channel, the website data and provide the website data to the compute device through the web application.

17. The system of claim 16, wherein the ZTENS device is further configured to translate the URL, to an internet protocol (IP) address using domain name service (DNS) data in a memory of the ZTENS device.

18. The system of claim 16, wherein the ZTENS device is further configured to parse the request for website data into multiple packets, the multiple packets including different portions of the request for website data, and wherein communicating the request for website data includes communicating different packets of the multiple packets over different communication channels including the second communication channel and a third communication channel.

19. The system of claim 18, wherein the second and third communication channels include different ones of a cellular data communication channel, a wireless fidelity communication channel, and an Ethernet communication channel.

20. The system of claim 19, wherein the first communication channel includes one of universal serial bus (USB) and Bluetooth operating using a webUSB or webBluetooth communication protocol, respectively.

* * * * *